United States Patent
Yokokura et al.

(10) Patent No.: US 8,215,357 B2
(45) Date of Patent: Jul. 10, 2012

(54) PNEUMATIC TIRE

(75) Inventors: Hiroyuki Yokokura, Kodaira (JP);
Humihiro Shiraishi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 598 days.

(21) Appl. No.: 12/373,751

(22) PCT Filed: Jul. 18, 2007

(86) PCT No.: PCT/JP2007/064212
§ 371 (c)(1),
(2), (4) Date: Feb. 6, 2009

(87) PCT Pub. No.: WO2008/010531
PCT Pub. Date: Jan. 24, 2008

(65) Prior Publication Data
US 2009/0288751 A1    Nov. 26, 2009

(30) Foreign Application Priority Data

Jul. 19, 2006 (JP) .................................. 2006-197140
Jul. 21, 2006 (JP) .................................. 2006-200089

(51) Int. Cl.
*B60C 9/02* (2006.01)
(52) U.S. Cl. ...................... 152/564; 152/517; 152/556
(58) Field of Classification Search .................. 152/517, 152/556, 564
See application file for complete search history.

(56) References Cited

U.S. PATENT DOCUMENTS

| | | | |
|---|---|---|---|
| 4,319,619 A * | 3/1982 | Kozima et al. | 152/209.5 |
| 4,506,718 A * | 3/1985 | Abe et al. | 152/527 |
| 4,691,752 A * | 9/1987 | Kabe et al. | 152/527 |
| 5,005,626 A * | 4/1991 | Oshima et al. | 152/527 |
| 6,720,378 B2 * | 4/2004 | Maruyama et al. | 524/495 |
| 2005/0075475 A1 * | 4/2005 | Taniguchi et al. | 528/220 |
| 2007/0012394 A1 * | 1/2007 | Kanehira | 152/527 |

FOREIGN PATENT DOCUMENTS

| | | | |
|---|---|---|---|
| EP | 1867495 A1 * | 12/2007 | |
| JP | 11-310019 | 10/1999 | |
| JP | 2000-264012 A | 9/2000 | |
| JP | 2001-295134 A | 10/2001 | |
| JP | 2001295134 A * | 10/2001 | |
| JP | 2002-339275 A | 11/2002 | |
| JP | 2003-013326 A | 1/2003 | |
| JP | 2004-074960 A | 3/2004 | |
| JP | 2004-136863 A | 5/2004 | |
| JP | 2004-218189 A | 8/2004 | |

(Continued)

*Primary Examiner* — Joseph Del Sole
*Assistant Examiner* — David N. Brown, II
(74) *Attorney, Agent, or Firm* — Sughrue Mion, PLLC (57) ABSTRACT

This invention provides a pneumatic tire provided with a carcass (4) comprised of one or more carcass plies formed by covering plural reinforcing cords arranged in parallel with a coating rubber and a pair of side reinforcing rubber layers (5) each having a crescent shape in section and disposed at an inside of the carcass, wherein ride comfort during usual running and durability during run-flat running are improved by applying a cord including a polyketone fiber and satisfying conditions of equation (I): $\sigma \geqq -0.01 \times E + 1.2$ and equation (II): $\sigma \geqq 0.02$ [wherein $\sigma$ is a heat shrinkage stress (cN/dtex) at 177° C. and E is an elastic modulus (cN/dtex) at 25° C. under a load of 49 N] to the reinforcing cord and a rubber composition having a loss tangent (tan δ) at 25° C. and 1% strain of less than 0.12 and a viscosity (G') at 130° C. during unvulcanization of not less than 50 MPa to the coating rubber.

19 Claims, 1 Drawing Sheet

FOREIGN PATENT DOCUMENTS

| | | | |
|---|---|---|---|
| JP | 2004-249873 A | | 9/2004 |
| JP | 2004249873 A | * | 9/2004 |
| JP | 2004-306657 A | | 11/2004 |
| JP | 2004-306658 A | | 11/2004 |
| JP | 2004-308024 A | | 11/2004 |
| JP | 2004-308027 A | | 11/2004 |
| JP | 2004306657 A | * | 11/2004 |
| JP | 2004-359812 A | | 12/2004 |
| WO | 02/02356 A1 | | 1/2002 |
| WO | 2006/077973 A1 | | 7/2006 |
| WO | WO 2006077973 A1 | * | 7/2006 |
| WO | 2006/098110 A1 | | 9/2006 |

* cited by examiner

PNEUMATIC TIRE

TECHNICAL FIELD

This invention relates to a pneumatic tire, and more particularly to a run-flat tire of a side reinforcing type improving ride comfort during usual running and durability during run-flat running.

BACKGROUND ART

Heretofore, as a tire capable of safely running over a certain distance without losing its load supporting ability even at a condition that an inner pressure of the tire is dropped due to puncture or the like or a so-called run-flat tire, there is known a run-flat tire of a side reinforcing type wherein a side reinforcing rubber layer having a crescent shape in section is disposed in a sidewall portion of the tire to improve a stiffness of the sidewall portion. For example, JP-A-H11-310019 discloses a run-flat tire in which a side reinforcing layer made of a rubber composition alone or a composite of a rubber composition and fibers or the like is disposed for improving the stiffness of the sidewall portion. However, during the running at the condition that the inner pressure of the tire is dropped or so-called run-flat running, as the deformation of the sidewall portion of the tire becomes large, the deformation of the side reinforcing rubber layer becomes also large, and as a result the heat generation of the side reinforcing rubber layer proceeds, and in some cases the temperature of the tire may reach 200° C. or higher, and under such a condition the rubber component itself in the side reinforcing rubber layer may be cut or a crosslinked portion between rubber components formed by vulcanization may be cut. In this case, there is a risk that the elastic modulus of the side reinforcing rubber layer is lowered and the bending of the tire further becomes large to promote the heat generation of the side reinforcing rubber layer and eventually the side reinforcing rubber layer exceeds its breaking limit to cause troubles of the tire relatively early.

As a means for delaying a time of causing such troubles, there are known a method wherein the elastic modulus of the side reinforcing rubber layer is increased by changing a formulation of a rubber composition applied to the side reinforcing rubber layer or a bead filler of the tire, and a method wherein a loss tangent (tan δ) of the side reinforcing rubber layer is lowered to suppress the heat generation of the side reinforcing rubber layer itself.

For example, WO 02/02356 proposes that a rubber composition comprising various modified conjugated diene-aromatic vinyl copolymers, a heat resistance improver and the like is applied to the side reinforcing layer and the bead filler. Also, JP-A-2004-74960 proposes that a rubber composition comprising a specific conjugated diene-based polymer and a phenolic resin is used in the side reinforcing layer and the bead filler. They are to increase the elastic modulus of the rubber composition used in the side reinforcing layer and the bead filler but also suppress the lowering of the elastic modulus at higher temperatures, and attain a large improvement of a run-flat durability.

However, the conventional approach from the formulation of the rubber composition applied to the side reinforcing rubber layer is critical and it is present status to increase the amounts of the side reinforcing rubber layer and the bead filler for ensuring at least certain durable distance during the run-flat running. However, when the amount of the side reinforcing rubber layer or the bead filler is increased, the longitudinal spring of the tire during usual running is increased to cause problems such as deterioration of ride comfort, deterioration of noise level, the increase of tire weight and the like in the usual running.

On the other hand, cellulose-based fibers such as rayon fibers or the like have been used as a reinforcing material for various rubber goods commencing with a reinforcing cord for the tire because they have a high elastic modulus at room temperature and are high in the adhesion to rubber. Also, the cellulose-based fibers are high in the Young's modulus at room and higher temperatures as compared with a polyester such as PET or the like and have a high heat dimensional stability as the heat shrinkage at 177° C. is 0.65 to 1.0%. Therefore, the cellulose-based fibers have also been used as a reinforcing cord for a carcass in the run-flat tire of the side reinforcing type.

However, the conventional run-flat tire of the side reinforcing type using the cellulose-based fiber cords such as rayon or the like as the reinforcing cord for the carcass is large in the bending of the tire during run-flat running because the elastic modulus of the cellulose-based fiber is not sufficiently high, and also as the temperature of the tire becomes higher during the run-flat running, the stiffness of the carcass ply is lowered to further enlarge the bending of the tire. On the contrary, there is proposed a tire wherein a polyketone fiber cords are used as the reinforcing cord for the carcass, but there is a fear of deteriorating the shape of the tire manufactured because the polyketone fiber cord is shrunk by heating in the production of the tire (see JP-A-2000-264012).

DISCLOSURE OF THE INVENTION

Under such a situation, it is an object of the invention to solve the above-mentioned problems of the conventional techniques and to provide a pneumatic tire improving the ride comfort during usual running and the durability during run-flat running. Moreover, it is another object of the invention to provide a pneumatic tire having a good tire shape in addition to the excellent ride comfort during the usual running and run-flat durability.

The inventors have made various studies in order to achieve the above objects and found that when a cord having specific heat shrinkage stress and elastic modulus and including at least a predetermined amount of a polyketone fiber is used as a reinforcing cord for a carcass and further (1) a rubber composition having specific heat shrinkage stress and viscosity, (2) a rubber composition having a specific dynamic elastic modulus or (3) a rubber composition having specific elastic modulus and dynamic elastic modulus is applied to a coating rubber covering the cord, the deterioration of the shape of the finished tire due to the heat shrinkage of the polyketone fiber during the vulcanization or the bending of the tire during the run-flat running can be suppressed, and hence the ride comfort during the usual running and run-flat durability of the tire can be improved.

Also, the inventors have made further studies and found that when a fiber cord including a specific amount of the polyketone fiber and having a specific heat shrinkage stress σ is used as a fiber cord constituting the carcass ply and a rubber composition having specific extension elastic modulus and dynamic elastic modulus as a vulcanized rubber and a specific viscosity G' as an unvulcanized rubber is applied to a side reinforcing rubber, the ride comfort during the usual running and the run-flat durability of the tire can be improved by using the cord constituting the carcass ply and the rubber composition constituting the side reinforcing rubber together, and as a result the invention has been accomplished.

That is, the first pneumatic tire according to the invention comprises a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion, wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the following equations (I) and (II):

$$\sigma \geq -0.01 \times E + 1.2 \quad \text{(I)}$$

$$\sigma \geq 0.02 \quad \text{(II)}$$

[wherein σ is a heat shrinkage stress (cN/dtex) at 177° C. and E is an elastic modulus (cN/dtex) at 25° C. under a load of 49 N]

and as the coating rubber is used a rubber composition having a loss tangent (tan δ) at 25° C. and 1% strain of less than 0.12 and a viscosity (G') at 130° C. during the unvulcanization of not less than 50 MPa.

At this moment, the heat shrinkage stress σ at 177° C. of the reinforcing cord is a stress generated at 177° C. in the cord when a sample of the reinforcing cord having a fixed length of 25 cm and subjected to a usual dipping treatment prior to vulcanization is heated at a temperature rising rate of 5° C./minute, while the elastic modulus E at 25° C. under a load of 49 N of the reinforcing cord is an elastic modulus as a unit of cN/dtex calculated from a tangent line at 49 N in S—S curve by a tensile test of the cord according to JIS.

Also, the second pneumatic tire according to the invention comprises a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion, wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the above equations (I) and (II)

and as the coating rubber is used a rubber composition having a dynamic elastic modulus (E') at 25° C. and 1% strain of not less than 8.0 MPa.

Further, the third pneumatic tire according to the invention comprises a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion, wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the above equations (I) and (II)

and as the coating rubber is used a rubber composition having a loss tangent (tan δ) at 25° C. and 1% strain of less than 0.12 and a dynamic elastic modulus (E') at 25° C. and 1% strain of not less than 8.0 MPa.

Moreover, the fourth pneumatic tire according to the invention comprises a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion, wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the above equations (I) and (II):

and to the side reinforcing rubber layer is used a rubber composition in which an elastic modulus at 25° C. and 100% elongation during the vulcanization is 5 to 20 MPa, and a dynamic elastic modulus (E') at 25° C. is not more than 10.5 MPa, and a minimum value of a dynamic elastic modulus (E') between 200° C. and 250° C. is not less than 75% of a dynamic elastic modulus (E') at 50° C., and a viscosity (G') at 130° C. during the unvulcanization is not less than 50 MPa.

In a preferable embodiment of the first to fourth pneumatic tires of the invention, the reinforcing cord in the carcass ply has a final twisting coefficient (N) defined by the following equation (III):

$$N = 0.001 \times n \times (0.125 \times D/\rho)^{1/2} \quad \text{(III)}$$

[wherein n is a final twisting number (turns/10 cm), ρ is a specific gravity (g/cm³) of the cord, and D is total dtex number (dtex) of the cord] and satisfying the following equation (IV):

$$0.6 \leq N \leq 0.9 \quad \text{(IV)}.$$

At this moment, the final twisting number n is a twisting number in the twisting of the plural filament bundles.

In another preferable embodiment of the first to third pneumatic tires of the invention, an end count of the reinforcing cords in the carcass ply is 35 to 60 cords/50 mm.

In another preferable embodiment of the fourth pneumatic tire of the invention, an end count of the reinforcing cords in the carcass ply is 30 to 60 cords/50 mm.

In the other preferable embodiment of the first to fourth pneumatic tires of the invention, the reinforcing cord in the carcass ply is formed by twisting two or three filament bundles each having a fineness of 500 to 2,000 dtex.

In a further preferable embodiment of the first to fourth pneumatic tires of the invention, the polyketone fiber constituting the reinforcing cord has a tensile strength as a raw yarn of not less than 10 cN/dtex, an elastic modulus of not less than 200 cN/dtex and a heat shrinkage factor after dry-heating at 150° C. for 30 minutes of 1 to 5%.

In another preferable embodiment of the first to fourth pneumatic tires of the invention, a polyketone constituting the polyketone fiber has substantially a repeating unit represented by the following general formula (V):

[wherein A is a moiety derived from an unsaturated compound polymerized with unsaturated bonds, and may be same or different in each of repeating units]. At this moment, it is preferable that the unsaturated compound forming A in the general formula (V) is ethylene.

In another preferable embodiment of the first to third pneumatic tires of the invention, as the coating rubber in the carcass ply is used a rubber composition formed by compounding a carbon black having a grade of not more than FEF into the rubber component. At this moment, term "carbon black having a grade of not more than FEF" means a carbon black having an iodine adsorption amount (IA) of not more than 45 mg/g and a dibutyl phthalate oil absorption (DBP) of not more than 125 mL/100 g.

In another preferable embodiment of the fourth pneumatic tire of the invention, a rubber component constituting the rubber composition used in the side reinforcing rubber layer comprises at least 50% by mass of a conjugated diene-based polymer having a vinyl bond content in conjugated diene unit of not less than 25%, a weight average molecular weight (Mw) of 200,000 to 900,000, and a molecular weight distribution (Mw/Mn) represented by a ratio of weight average molecular weight to number average molecular weight (Mn) of 1 to 4. At this moment, the conjugated diene-based polymer constituting the rubber component is preferably a modified conjugated diene-based polymer containing at least one of tin atom, nitrogen atom and silicon atom in its molecule. Also, the modified conjugated diene-based polymer is more preferable to be modified with an isocyanate compound, and as the isocyanate compound are preferable diphenylmethane diisocyanate and/or a polymeric diphenylmethane diisocyanate.

In another preferable embodiment of the fourth pneumatic tire of the invention, the rubber composition used in the side reinforcing rubber layer comprises not less than 3 parts by mass in total of a resin and a curing agent thereof based on 100 parts by mass of the rubber component. At this moment, it is preferable that the resin is a phenol resin.

In the other preferable embodiment of the fourth pneumatic tire of the invention, a maximum thickness of the side reinforcing rubber layer is 6 to 13 mm.

According to the invention, there can be provided a pneumatic tire using a carcass ply formed by covering a cord having specific heat shrinkage stress and elastic modulus and including at least a given amount of a polyketone fiber with a coating rubber made from (1) a rubber composition having specific heat shrinkage stress and viscosity, (2) a rubber composition having a specific dynamic elastic modulus or (3) a rubber composition having specific elastic modulus and dynamic elastic modulus, and improving the ride comfort during the usual running and durability during the run-flat running. Also, there can be provided a pneumatic tire improving the ride comfort during the usual running and durability during the run-flat running, wherein reinforcing cord including a specific amount of a polyketone fiber and having specific heat shrinkage stress and elastic modulus are used in a carcass ply and a rubber composition having specific extension elastic modulus and dynamic elastic modulus as a vulcanized rubber and a specific viscosity G' as an unvulcanized rubber is used in the side reinforcing rubber layer.

BEST MODE FOR CARRYING OUT THE INVENTION

Figure 1:
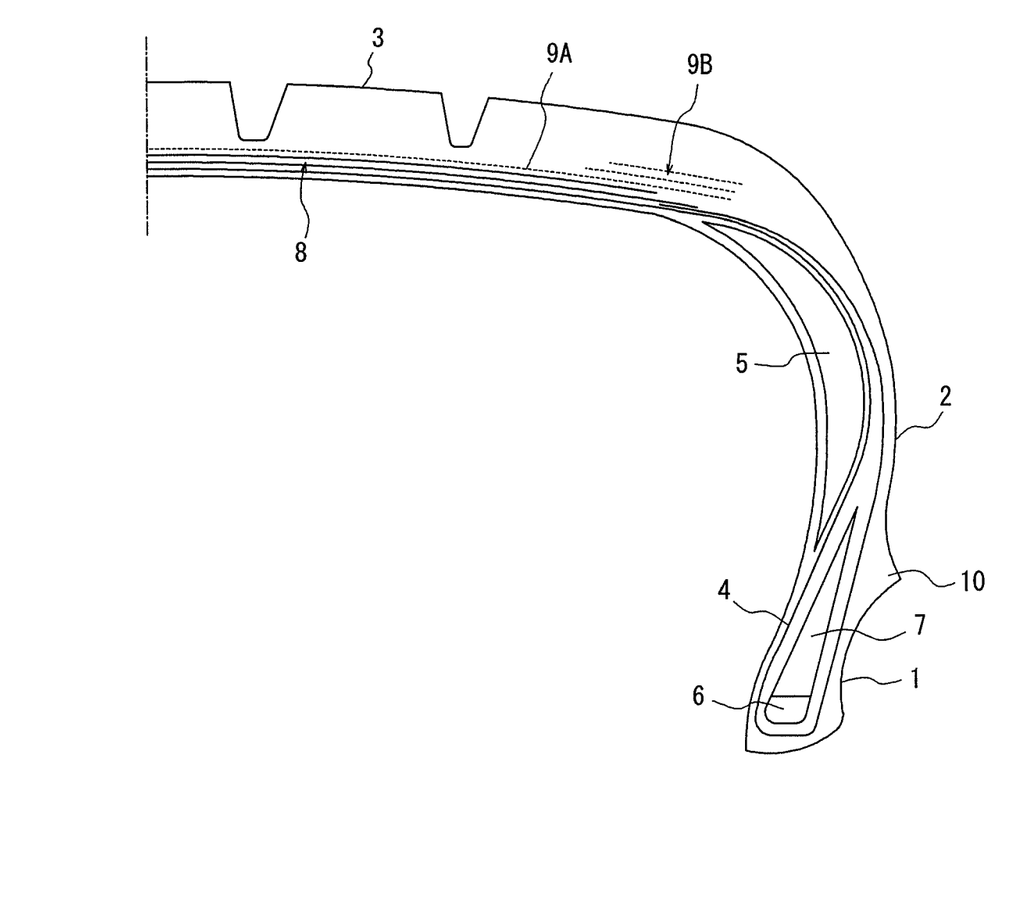
FIG. 1 is a sectional view of a right-half portion of an embodiment of the pneumatic tire according to the invention.

The invention will be described in detail below with reference to the attached drawing. FIG. 1 is a sectional view of a right-half portion of an embodiment of the pneumatic tire according to the invention. The tire shown in FIG. 1 comprises a pair of bead portions 1, a pair of sidewall portions 2, a tread portion 3 continuing to both the sidewall portions 2, a radial carcass 4 toroidally extending between the pair of bead portions 1 to reinforce these portions 1, 2, 3 and comprised of one or more carcass plies, and a pair of side reinforcing rubber layers 5 each disposed at the inside of the carcass 4 in the sidewall portion 2. Moreover, the shape of the illustrated side reinforcing rubber layer 5 is a crescent shape in section.

In the illustrated tire, a bead filler 7 is disposed on an outside of a bead core 6 embedded in the respective bead portion 1 in a radial direction of the tire and further a belt 8 comprised of two belt layers is disposed on an outside of a crown portion of the radial carcass 4 in the radial direction of the tire. In addition, a belt reinforcing layer 9A is disposed at an outside of the belt 8 in the radial direction of the tire so as to cover a whole of the belt 8, and a pair of belt reinforcing layers 9B is disposed so as to cover only both end portions of the belt reinforcing layer 9A. At this moment, the belt layer is usually composed of a rubberized layer containing belt cords slantly extending with respect to an equatorial plane of the tire. Further, the belt 8 is constituted by laminating the two belt layers so as to cross the belt cords constituting the belt layers with each other with respect to the equatorial plane of the tire. Also, each of the belt reinforcing layers 9A and 9B is usually composed of a rubberized layer containing cords arranged substantially in parallel with respect to the circumferential direction of the tire.

Moreover, the radial carcass 4 of the illustrated tire is comprised of one carcass ply formed by covering plural reinforcing cords arranged in parallel with a coating rubber. The radial carcass 4 consists of a main body portion toroidally extending between a pair of bead cores 6 embedded in the respective bead portions 1 and a turnup portion wound around each bead core 6 from an inside to an outside in a widthwise direction of the tire. In the pneumatic tire according to the invention, the ply number and structure of the radial carcass 4 are not limited thereto. For example, as shown in the illustrated tire, a structure that the turnup portion is extended up to an end portion of the belt 8 in the radial direction of the tire or a so-called envelope structure may be applied. In the tire according to the invention, the arrangement of the bead filler 7 is not essential and the bead filler having another shape may be arranged.

The belt 8 in the illustrated tire is comprised of two belt layers, but the number of belt layers constituting the belt 8 is not limited thereto in the tire according to the invention. Further, the belt reinforcing layers 9A and 9B have a so-called cap-layer structure constructed with one belt reinforcing layer 9A covering a whole of the belt 8 and two belt reinforcing layers 9B covering only both end portions of the belt reinforcing layer 9A. In the tire according to the invention, the arrangement of the belt reinforcing layers 9A and 9B is not essential, and belt reinforcing layers having another structure and layer number may be arranged.

In the illustrated tire, a rim guard 10 having substantially a triangular shape in section is provided on an outside of the turnup portion of the radial carcass 4 in a region ranging from the sidewall portion 2 to the bead portion 1 in the widthwise direction of the tire, but the arrangement of the rim guard 10 is not also essential, and a rim guard having another shape may be arranged in the tire according to the invention.

In the pneumatic tire according to the invention, the carcass ply is formed by covering plural reinforcing cords arranged in parallel with a coating rubber, and the reinforcing cord is a cord formed by twisting plural filament bundles each including not less than 50% by mass of a polyketone fiber and is required to satisfy conditions of the following equations (I) and (II):

$$\sigma \geq -0.01 \times E + 1.2 \quad \text{(I)}$$

$$\sigma \geq 0.02 \quad \text{(II)}$$

[wherein σ is a heat shrinkage stress (cN/dtex) at 177° C. and E is an elastic modulus (cN/dtex) at 25° C. under a load of 49 N].

When the reinforcing cord constituting the carcass ply includes the polyketone fiber, since the heat shrinkage stress of the reinforcing cord at a high temperature is large, a high stiffness is developed from a time that an initial strain of the tire is relatively small in such a run-flat running that the temperature of the tire becomes high, whereby the bending stiffness of the sidewall portion in the radial direction of the tire is increased to suppress the bending of the tire, and as a result the run-flat durability of the tire can be improved. On the other hand, because the reinforcing cord is low in the stiffness when the strain of the tire is small in the extending direction of the cord during the usual running, the longitudinal spring of the tire during the usual running is not increased, and also the weight of the reinforcing cord is equal to that of the conventional cellulose-based fiber cord such as rayon or the like used in the carcass and does not increase the tire weight, hence the deterioration of the ride comfort of the tire can be suppressed.

Moreover, when the reinforcing cord to be used does not satisfy the relationship of the equation (I), if cords being high in the heat shrinkage stress σ but low in the elastic modulus E are used, the bending of the tire during the run-flat running can not be sufficiently suppressed, and hence the run-flat durability of the tire is lowered, while if cords being high in the elastic modulus E but small in the heat shrinkage stress σ are used, the longitudinal spring of the tire during the usual running becomes large and hence the ride comfort of the tire during the usual running is deteriorated. Also, when the heat shrinkage stress σ at 177° C. of the cord used is less than 0.02 cN/dtex, the bending amount during the run-flat running becomes large and the run-flat durable distance is lacking.

The reinforcing cord is preferable to have a heat shrinkage stress σ at 177° C. of not more than 1.5 cN/dtex. When the heat shrinkage stress σ exceeds 1.5 cN/dtex, the shrinkage force during the vulcanization becomes too large, and as a result the cord disorder and rubber disarray inside the tire are caused to bring about a fear of deteriorating the durability or the uniformity. Furthermore, the reinforcing cord preferably has a heat shrinkage stress σ at 177° C. of not less than 0.20 cN/dtex from a viewpoint of suppressing the tire deformation during the run-flat running, more preferably a heat shrinkage stress σ at 177° C. of not less than 0.30 cN/dtex, even more preferably not less than 0.40 cN/dtex from a viewpoint of surely controlling the tire deformation during the run-flat running. Moreover, the reinforcing cord preferably has an elastic modulus E at 25° C. under a load of 49 N of not less than 30 cN/dtex from a viewpoint of controlling the tire deformation during the run-flat running, more preferably an elastic modulus E at 25° C. under a load of 49 N of not less than 80 cN/dtex from a viewpoint of surely controlling the tire deformation during the run-flat running. In addition, the reinforcing cord preferably has an elastic modulus E at 25° C. under a load of 49 N of not more than 170 cN/dtex from a viewpoint of sufficiently ensuring the fatigue resistance, more preferably an elastic modulus E at 25° C. under a load of 49 N of not more than 150 cN/dtex from a viewpoint of improving the fatigue resistance.

The reinforcing cord constituting the carcass ply in the pneumatic tire according to the invention is required to include the polyketone fiber of not less than 50% by mass, preferably not less than 70% by mass, more preferably 100% by mass. When the content of the polyketone in the reinforcing cord is not less than 50% by mass, the excellent heat shrinkage, strength, dimensional stability, heat resistance, adhesion of the cord to the rubber and the like can be obtained. While when the content of the polyketone in the reinforcing cord is less than 50% by mass, any one of the performances such as strength and heat resistance of the tire and the adhesion of the reinforcing cord to the rubber becomes insufficient.

Also, when the reinforcing cord constituting the carcass ply includes a fiber other than the polyketone fiber, as long as the ratio of such a fiber is less than 50% by mass, the fiber is not particularly limited, and well-known fibers such as polyamide fiber, polyester fiber, rayon fiber, aramid fiber and the like are used depending on the application and purpose. If the content of the fiber other than the polyketone fiber exceeds 50% by mass, for example, the strength and dimensional stability are damaged in case of a cord made from the polyester fiber or the polyamide fiber, and the strength is largely damaged in case of a warp made from the rayon fiber, and the adhesion to the rubber is largely damaged in case of a warp made from the aramid fiber.

Further, in the reinforcing cord applied to the carcass ply, a final twisting coefficient (N) defined by the following equation (III):

$$N = 0.001 \times n \times (0.125 \times D/\rho)^{1/2} \quad \text{(III)}$$

[wherein n is a final twisting number (turns/10 cm), and ρ is a specific gravity (g/cm³) of the cord, and D is total dtex number (dtex) of the cord] is preferably with a range of the following equation (IV):

$$0.6 \leq N \leq 0.9 \quad \text{(IV),}$$

more preferably with a range of the following equation:

$$0.7 \leq N \leq 0.85.$$

At this moment, when the final twisting coefficient (N) is less than 0.6, the fatigue properties are seriously deteriorated and the durability is lacking, while when it exceeds 0.9, the untwisting of the twisted yarn takes place and the workability is seriously deteriorated.

In the carcass ply of the pneumatic tire according to the invention, the end count of the reinforcing cords is preferable to be within a range of 30 to 60 cords/50 mm, more preferably within a range of 35 to 60 cords/50 mm. When the end count of the reinforcing cord in the carcass ply is less than 30 cords/50 mm, the strength of the carcass is lacking and the durability is lacking. Moreover, even if the end count exceeds 60 cords/50 mm, the end count is not particularly limited as long as it is possible to embed the cords. Further, since the reinforcing cord is high in the strength as compared with the cellulose-based fiber cord such as rayon or the like, even if the end count of the cord is decreased as compared with the conventional end count of the fiber cords, the bending of the tire during the run-flat running is suppressed and hence the run-flat durability of the tire can be improved, while the tire weight can be reduced to improve the ride comfort of the tire.

The reinforcing cord used in the carcass ply is preferable to be formed by twisting two or three filament bundles each having a fineness of 500 to 2000 dtex. When the fineness of the filament bundle used in the reinforcing cord is less than 500 dtex, both the elastic modulus and the heat shrinkage stress are insufficient, while when it exceeds 2000 dtex, the cord diameter becomes thick and the end count can not be made dense. Moreover, even if the number of the filament bundles is not less than 4, it is not particularly limited as long as the relationship between the equations (I) and (II) are satisfied. As the reinforcing cord used in the carcass ply is preferable a cord being 1670 dtex/2 (total fineness 3340 dtex), 1100 dtex/2 (total fineness 2200 dtex) or the like.

The reinforcing cord used in the carcass ply is preferable to have a reversibility of shrinking at an elevated temperature and stretching in the turning to room temperature. In this case, the reinforcing cords in the carcass ply shrink to increase the stiffness at an elevated temperature or during the run-flat running, and hence the bending of the sidewall portion of the tire can be suppressed, while the reinforcing cords in the carcass ply stretch to decrease the stiffness at a low temperature or during the usual running, and hence the longitudinal spring of the tire can be lowered to suppress the deterioration of the ride comfort of the tire during the usual running. Moreover, by using reversible cords in which a difference between the heat shrinkage stresses at 20° C. and 177° C. is not less than 0.20 cN/dtex, preferably not less than 0.25 cN/dtex, the effects during the normal running and the run-flat running can be highly and simultaneously established.

The reinforcing cord constituting the carcass ply in the pneumatic tire according to the invention is formed by twisting the filament bundles including the polyketone fiber. As a polyketone being a raw material of the polyketone fiber is preferable a polyketone substantially having a repeating unit represented by the formula (V):

(V)

[wherein A is a moiety derived from an unsaturated compound polymerized with unsaturated bonds, and may be same or different in each of repeating units]. Moreover, among the polyketones, a polyketone wherein not less than 97 mol % of the repeating unit is 1-oxotrimethylene [—$CH_2$—$CH_2$—CO—] is preferable, and a polyketone wherein not less than 99 mol % is 1-oxotrimethylene is more preferable, and a polyketone wherein 100 mol % is 1-oxotrimethylene is most preferable. The higher the ratio of 1-oxotrimethylene in the repeating unit, the better the regularity of the molecular chain, and hence a fiber having high crystallizability and orientation degree is obtained.

In the polyketone as the raw material of the polyketone fiber, ketone groups may be partly bonded with each other or moieties derived from the unsaturated compound may be bonded with each other, but it is preferable that the ratio of alternate arrangement of the moiety derived from the unsaturated compound and the ketone group is not less than 90% by mass, more preferably not less than 97% by mass, most preferably 100% by mass.

The unsaturated compound forming A in the formula (V) is most preferably ethylene, and may be an unsaturated hydrocarbon other than ethylene such as propylene, butene, pentene, cyclopentene, hexene, cyclohexene, heptene, octene, nonene, decene, dodecene, styrene, acetylene, allene or the like; a compound containing an unsaturated bond such as methyl acrylate, methyl methacrylate, vinyl acetate, acrylamide, hydroxyethyl methacrylate, undecenic acid, undecenol, 6-chlorohexene, N-vinylpyrolidone, diethylester of sulnylphosphonic acid, sodium styrenesulfonate, sodium allylsulfonate, vinylpyrolidone, vinyl chloride or the like; and so on.

As the polymerization degree of the polyketone, it is preferable that a limit viscosity (η) defined by the following formula:

$$[\eta] = \lim_{c \to o} \frac{(T-t)}{(t \cdot C)}$$

[wherein t is a passing time of hexafluoroisopropanol having a purity of not less than 98% at 25° C. through a viscosity tube, and T is a passing time of a diluted solution of polyketone dissolved in the hexafluoroisopropanol at 25° C. through the viscosity tube; and C is a mass (g) of a solute in 100 mL of the diluted solution] is within a range of 1 to 20 dL/g, more preferably 2 to 10 dL/g, even more preferably 3 to 8 dL/g. When the limit viscosity is less than 1 dL/g, the molecular weight is too small and it is difficult to obtain a high-strength polyketone fiber cord, but also troubles such as napping, breaking and the like are frequently caused in the steps of spinning, drying and drawing. While, when the limit viscosity exceeds 20 dL/g, the synthesis of the polymer takes great time and cost, but also it is difficult to uniformly dissolve the polymer, which may badly affect the spinability and properties.

As a method for forming polyketone fiber are preferable (1) a method comprising the steps of spinning an undrawn fiber and subjecting to a multi-stage heat drawing in which a final drawing at the multi-stage heat drawing step is carried out at specified temperature and draft ratio, and (2) a method comprising the steps of spinning an undrawn fiber, subjecting to heat drawing and then quenching under a high tension. By forming the polyketone fiber through the method (1) or (2), desirable filaments suitable for the production of the polyketone fiber cord can be obtained.

The method for spinning the undrawn polyketone fiber is not particularly limited, but may adopt the conventionally well-known methods. Concretely, there are mentioned a wet spinning method using an organic solvent such as hexafluoroisopropanol, m-cresol or the like as disclosed in JP-A-H02-112413, JP-A-H04-228613 and JP-A-H04-505344, and a wet spinning method using an aqueous solution of zinc salt, calcium salt, thiocyanate, iron salt or the like as disclosed in WO99/18143, WO00/09611, JP-A-2001-164422, JP-A-2004-218189 and JP-A-2004-285221. Among them, the wet spinning method using the aqueous solution of the salt is preferable.

For example, in the wet spinning method using the organic solvent, a polyketone polymer is dissolved in hexafluoroisopropanol, m-cresol or the like at a concentration of 0.25 to 20% by mass and extruded through a spinning nozzle to from a fiber and then the solvent is removed in a non-solvent bath of toluene, ethanol, isopropanol, n-hexane, isooctane, acetone, methyl ethyl ketone or the like, whereby the undrawn polyketone fiber can be obtained after the washing.

On the other hand, in the wet spinning method using the aqueous solution, the polyketone polymer is dissolved in an aqueous solution of zinc salt, calcium salt, thiocyanate, iron salt or the like at a concentration of 2 to 30% by mass and extruded through a spinning nozzle into a coagulation bath at 50 to 130° C. to conduct gel spinning and then desalted and dried to obtain the undrawn polyketone fiber. In the aqueous solution dissolving the polyketone polymer is preferably used a mixture of a zinc halide and a halide of an alkali metal or an alkaline earth metal. In the coagulation bath can be used water, an aqueous solution of a metal salt, or an organic solvent such as acetone, methanol or the like.

As the method for drawing the undrawn fiber is preferable a heat drawing method wherein the undrawn fiber is drawn by heating to a temperature higher than the glass transition temperature of the undrawn fiber. Moreover, the drawing of the undrawn fiber in the above method (2) may be carried out at one stage, but it is preferable to conduct the multi-stage drawing. The heat drawing method is not particularly limited, and may adopt a method of running the fiber on, for example, a heat roll or a heat plate, and so on. At this moment, the heat drawing temperature is preferably within a range of 110° C. to (a melting point of polyketone), and the total drawing ratio is preferably not less than 10 times.

When the formation of the polyketone fiber is carried out through the method (1), the temperature at the final drawing step of the multi-stage heat drawing is preferable to be within a range of 110° C. to (drawing temperature at drawing step just before the final drawing step—3° C.), and the drawing ratio at the final drawing step of the multi-stage heat drawing is preferable to be within a range of 1.01 to 1.5 times. On the other hand, when the formation of the polyketone fiber is carried out through the method (2), the tension applied to the fiber after the heat drawing is preferable to be within a range of 0.5 to 4 cN/dtex, and the cooling rate in the quenching is preferable to be not less than 30° C./second, and the cooling-end temperature in the quenching is preferable to be not more than 50° C. The quenching method of the heat-drawn polyketone fiber is not particularly limited, and may adopt the conventionally known methods. Concretely, the cooling method using the roll is preferable. Moreover, since the thus obtained polyketone fiber is large in the retention of elastic strain, it is preferable that the fiber is usually subjected to a relaxation heat treatment so as to make the fiber length shorter than the fiber length after the heat drawing. At this moment, the temperature of the relaxation heat treatment is preferable to be within a range of 50 to 100° C. and the relaxation ratio is preferable to be within a range of 0.980 to 0.999 times.

In the pneumatic tire according to the invention, the polyketone fiber used in the reinforcing cord preferably has a tensile strength as a raw yarn of not less than 10 cN/dtex, an elastic modulus of not less than 200 cN/dtex and a heat shrinkage factor after drying and heating at 150° C. for 30 minutes of 1 to 5%. By applying cords including the polyketone having the above properties to the carcass ply, the run-flat durability can be improved while maintaining the ride comfort of the tire. In addition, the possible penetration during the tire manufacturing can be improved. Moreover, the tensile strength and the elastic modulus are values obtained by measuring according to JIS L1013. At this moment, the elastic modulus is a value of an initial elastic modulus calculated from a load at an elongation of 0.1% and a load at an elongation of 0.2%. The heat shrinkage factor after the dry-heating at 150° C. for 30 minutes is a value evaluated according to the following equation after the dry-heating treatment is conducted at 150° C. for 30 minutes in an oven and the fiber length before and after the dry-heating treatment is measured under a load of 1/30 (cN/dtex):

Heat shrinkage factor (%)=[($Lb-La$)/$Lb$]×100.

In the equation, Lb is a fiber length before the dry-heating treatment, and La is a fiber length after the dry-heating treatment.

The tensile strength as a raw yarn of the polyketone fiber is preferable to be not less than 10 cN/dtex, more preferably not less than 15 cN/dtex. When the tensile strength is within the above range, the strength as a tire can be sufficiently ensured. The upper limit of the tensile strength is not particularly limited, and is commonly about 18 cN/dtex. Moreover, the elastic modulus as a raw yarn of the polyketone fiber is preferable to be not less than 200 cN/dtex, more preferably 250 cN/dtex. When the elastic modulus is within the above range, the buckling-suppressing effect during the run-flat running can be obtained while ensuring a sufficient shape-holding ability as a tire. The upper limit of the elastic modulus is not particularly limited, and is commonly about 350 cN/dtex. Furthermore, the heat shrinkage factor of the polyketone fiber after the dry-heating treatment at 150° C. for 30 minutes is preferable to be within a range of 1 to 5%, more preferably within a range of 2 to 4%, for example, as a cord after the adhesion treatment (dip treatment). When the heat shrinkage factor is within the above range, the aligning efficiency and the tire strength by heating during the tire production are ensured and the stable tire shape can be obtained.

Also, the polyketone fiber is preferable to have a crystal structure that a crystallinity is 50-90% and a crystal orientation is not less than 95%. When the crystallinity is less than 50%, the formation of the fiber structure is insufficient and the sufficient strength is not obtained but also there is a fear that the shrinking property and dimensional stability in the heating become unstable. Therefore, the crystallinity is preferably 50-90%, more preferably 60-85%.

The production method of the reinforcing cord is not particularly limited. When the reinforcing cord is a structure formed by twisting plural, preferably two or three, filament bundles including not less than 50% by mass of the polyketone fiber or a twin strand structure, it can be obtained as a twisted cord, for example, by ply-twisting the filament bundles, combining the plural bundles and then final-twisting them in an opposite direction. On the other hand, when the reinforcing cord is a structure formed by twisting one filament bundle or a single strand structure, it can be obtained as a twisted cord, for example, by aligning and twisting the filament bundle made from polyketone in one direction.

Also, the heat shrinkage stress of the reinforcing cord becomes larger than the conventional fiber material. For example, it is about 4 times larger than nylon 66 and close to 10 times larger than polyethylene terephthalate. In order to most effectively utilize the high heat shrinkage characteristics of the reinforcing cord, it is desirable that the treatment temperature in processing and the product temperature in use are close to the temperature indicating the maximum heat shrinkage stress (hereinafter referred to as maximum heat shrinkage temperature). The maximum heat shrinkage temperature is preferable to be a range of 100-250° C., more preferably 150-240° C. because, for example, the processing temperature such as RFL treating temperature of the cord or vulcanization temperature of the cord formed by covering with the coating rubber is generally 100-250° C. and the temperature in the heat generation of the material such as tire or belt in the repetitive use or during the high-speed rotation is 100-200° C.

In the pneumatic tire according to the invention, the object of the invention can be attained by applying a specific rubber composition as a coating rubber of the reinforcing cord or applying a specific rubber composition to the side reinforcing rubber layer in addition to the application of the above-mentioned reinforcing cord to the carcass ply.

In the pneumatic tire according to the invention, when a specific rubber composition is used as the coating rubber of the reinforcing cord in addition to the application of the reinforcing cord to the carcass ply, this rubber composition is characterized to be (1) a rubber composition having a loss tangent (tan δ) at 25° C. and 1% strain of less than 0.12 and a viscosity (G') at 130° C. during the unvulcanization of not less than 50 MPa, (2) a rubber composition having a dynamic elastic modulus (E') at 25° C. and 1% strain of not less than 8.0 MPa, or (3) a rubber composition having a loss tangent (tan δ) at 25° C. and 1% strain of less than 0.12 and a dynamic elastic modulus (E') at 25° C. and 1% strain of not less than 8.0 MPa.

When the reinforcing cord including the polyketone fiber is covered with the conventional coating rubber for the carcass ply, since the cord is large in the heat shrinkage stress at an elevated temperature, there is a fear that strain is caused between the cord and the rubber by the heating in the tire production to deteriorate the tire shape. Therefore, by using the rubber composition of the items (1) to (3) as the coating rubber of the reinforcing cord including the polyketone fiber, the deterioration of the tire shape due to the heat shrinkage of the polyketone during the vulcanization can be suppressed to improve the ride comfort of the tire during the usual running and the run-flat durability, or the heat generation of the tire during the run-flat running can be suppressed to further improve the run-flat durability.

The rubber composition of the item (1) is required to have a viscosity (G') at 130° C. during the unvulcanization of not less than 50 MPa. In this case, the deterioration of the tire shape due to the heat shrinkage of the polyketone during the vulcanization can be suppressed to improve the ride comfort of the tire during the usual running and the run-flat durability.

The rubber compositions of the items (1) and (3) are required to have a loss tangent (tan δ) at 25° C. and 1% strain of less than 0.12. When the loss tangent (tan δ) at 25° C. and 1% strain is not less than 0.12, the run-flat durability is lowered because the heat generation of the tire during the run-flat running cannot be suppressed.

The rubber compositions of the items (2) and (3) are required to have a dynamic elastic modulus (E') at 25° C. and 1% strain of not less than 8.0 MPa. When the dynamic elastic modulus (E') at 25° C. and 1% strain is less than 8.0 MPa, the strain of the tire during the run-flat running becomes large and the heat generation of the tire becomes large.

The viscosity, loss tangent and dynamic elastic modulus in the rubber compositions of the items (1) to (3) can be adjusted to the above ranges by properly selecting the kind and the compounding ratio of the rubber component and various ingredients such as a filler and the like constituting the rubber composition. Concretely, a carbon black having a grade of not more than FEF is preferable to be used as an ingredient used in the rubber composition. If a carbon black having a grade of more than FEF is compounded into the rubber component, it is difficult to obtain the above properties. Moreover, as mentioned above, the term "carbon black having a grade of not more than FEF" means a carbon black having an iodine adsorption amount (IA) of not more than 45 mg/g and a dibutyl phthalate oil absorption (DBP) of not more than 125 mL/100 g and includes, for example, FEF, GPF and SRF grade carbon blacks and the like.

On the other hand, as the rubber component used in the rubber compositions of the items (1) to (3) are mentioned, for example, natural rubber (NR), a diene-based synthetic rubber and the like. As the diene-based synthetic rubber are concretely mentioned a polyisoprene rubber (IR), a styrene-butadiene copolymer rubber (SBR), a butadiene rubber (BR), an ethylene-propylene-diene rubber (EPDM), a chloroprene rubber (CR), a halogenated butyl rubber, acrylonitrile-butadiene rubber (NBR) and the like. These rubber components may be used alone or in a blend of two or more.

The rubber compositions of the items (1) to (3) can be properly compounded with ingredients usually used in the rubber industry such as a softening agent, an antioxidant, a vulcanizing agent, a vulcanization accelerator, a scorch retarder, zinc white, stearic acid, a silane coupling agent and the like within a scope of not damaging the object of the invention in addition to the aforementioned rubber component and the filler such as carbon black. As the ingredient can be preferably used commercially available ones. The rubber composition can be produced by compounding the rubber component with, if necessary, the properly selected various ingredients and milling, warming, extruding and so on.

The pneumatic tire according to the invention can be produced according to the usual method by applying the carcass ply, which is formed by covering the reinforcing cord including the above-mentioned polyketone fiber with the rubber composition of the items (1) to (3), to the radial carcass 4. In the pneumatic tire according to the invention, as a gas filled into the tire can be used usual air or air having a regulated partial oxygen pressure but also inert gases such as nitrogen and so on.

In the pneumatic tire according to the invention, when a specific rubber composition is applied to the side reinforcing rubber layer in addition to the application of the reinforcing cord to the carcass ply, such a rubber composition is characterized to be (4) a rubber composition in which an elastic modulus at 25° C. and 100% elongation during vulcanization is 5 to 20 MPa, a dynamic elastic modulus (E') at 25° C. during vulcanization is not more than 10.5 MPa, a minimum value of a dynamic elastic modulus (E') between 200° C. and 250° C. is not less than 75% of a dynamic elastic modulus (E') at 50° C. and a viscosity (G') at 130° C. during unvulcanization is not less than 50 MPa.

In the rubber composition of the item (4), the bending during the run-flat running can be made suitable when the elastic modulus at 25° C. and 100% elongation during the vulcanization is 5 to 20 MPa. Also, the ride comfort during the usual running can be ensured when the dynamic elastic modulus (E') at 25° C. is not more than 10.5 MPa. The value of the elastic modulus at 25° C. and 100% elongation during the vulcanization is desirable to be large in view of the need for supporting the load during the run-flat running. While, the value of the dynamic elastic modulus (E') at room temperature is desirable to be small in view of ensuring the ride comfort. When the elastic modulus at 25° C. and 100% elongation and the dynamic elastic modulus (E') at 25° C. are within the above ranges, the ride comfort during the usual running and the durability during the run-flat running can be ensured. Furthermore, a combination of a resin and a curing agent as described below improves the elastic modulus at 100% elongation but is less in the improvement of the dynamic elastic modulus (E'), so that it lightly affects the ride comfort, and hence the ride comfort can be controlled by varying the amount of the filler such as carbon black or the like.

In the rubber composition of the item (4), the minimum value of the dynamic elastic modulus (E') between 200° C. and 250° C. is required to be not less than 75% of the dynamic elastic modulus (E') at 50° C. When the minimum value of a dynamic elastic modulus (E') between 200° C. and 250° C. is not less than 75% of the dynamic elastic modulus (E') at 50° C., the excellent ride comfort and run-flat durability can be simultaneously established. The minimum value of the dynamic elastic modulus (E') between 200° C. and 250° C. in the rubber composition of the item (4) is preferable to be not less than 85% of the dynamic elastic modulus (E') at 50° C., more preferably the same (100%) or more. Among them, the minimum value of the dynamic elastic modulus between 200° C. and 250° C. is preferable to be 10% or more, specifically 20% or more higher than that of the dynamic elastic modulus (E') at 50° C. The reinforcing rubber, which becomes a high temperature by using such a rubber composition through the run-flat running, is small in the softening, and can maintain the run-flat durability. Moreover, in the rubber composition of the item (4), the dynamic elastic modulus (E') at 50° C. is preferable to be within a range of 2 to 20 MPa.

In the rubber composition of the item (4), the viscosity (G') at 130° C. during the unvulcanization is required to be not less than 50 MPa. When the viscosity (G') at 130° C. of the unvulcanized rubber is not less than 50 MPa, the deterioration in the workmanship of the tire such as uniformity or the like due to the cord disorder by the shrinkage of the polyketone during the vulcanization can be prevented.

The rubber component constituting the rubber composition of the item (4) is preferable to include at least 50% by mass of a conjugated diene-based polymer having a vinyl bond content in conjugated diene unit of not less than 25%, a weight average molecular weight (Mw) of 200,000 to 900,000, a molecular weight distribution (Mw/Mn) represented by a ratio of weight average molecular weight to number average molecular weight (Mn) of 1 to 4. Moreover, the conjugated diene-based polymer is preferable to be a modified conjugated diene-based polymer formed by modifying with a compound containing at least one of tin atom, nitrogen atom and silicon atom in its molecule. The vinyl bond content in conjugated diene unit of the modified conjugated diene-based polymer is preferable to be not less than 25%. When the vinyl bond content is not less than 25%, the lowering of the dynamic elastic modulus (E') due to the breakage of the sulfur crosslinking at an elevated temperature of not less than 150° C. can be suppressed to sufficiently develop the effect of suppressing the decrease of the elastic modulus due to the rise of the temperature. From this point of view, the vinyl bond content is preferably not less than 30%, more preferably not less than 35%, particularly preferably 40 to 60%. The upper limit of the vinyl bond content is not particularly limited, and the vinyl content is preferable to be not more than 65% from a viewpoint of ensuring the polymer elasticity. Moreover, the weight average molecular weight (Mw) of the modified conjugated diene-based polymer is preferable to be 200,000 to 900,000. When the weight average molecular weight (Mw) is within the above range, the tensile and rolling properties of the rubber composition are excellent and the lowering of the workability can be suppressed. From the similar viewpoint, Mw is preferable to be 300,000 to 800,000, particularly 300,000 to 700,000. Also, the molecular weight distribution (Mw/Mn) is preferable to be 1 to 4. When the value of the molecular weight distribution exceeds 4, there is a tendency that the lowering of the heat generation and the maintenance of the elastic modulus at a temperature region of not less than 150% become difficult. From these viewpoints, the molecular weight distribution is more preferable to be 1 to 3. The rubber component constituting the rubber composition of the item (4) is preferable to include not less than 50% by mass of the conjugated diene-based polymer having the above-mentioned characteristics. When not less than 50% by mass of the polymer is included, the lowering of the elastic modulus of the rubber due to the rise of the temperature is suppressed and also the lowering of the dynamic elastic modulus and the increase of the loss tangent (tan δ) of the rubber due to the rise of the temperature can be sufficiently suppressed. From this point of view, the rubber component is more preferable to include not less than 60% by mass of the polymer.

As the rubber component of the rubber composition of the item (4), it is particularly desirable to be a rubber component having the above-mentioned characteristics and containing not less than 50% by mass of the modified conjugated diene-based polymer having at least one of nitrogen atom and silicon atom in its molecule because the aforementioned effects are obtained but also the heat generation of the rubber composition is suppressed.

The conjugated diene-based polymer usable in the rubber component of the rubber composition of the item (4) is preferable to be a conjugated diene homopolymer, a copolymer of conjugated dienes or a conjugated diene-aromatic vinyl copolymer, and particularly polybutadiene and styrene-butadiene copolymer are preferable. Among them, polybutadiene is preferable. As the conjugated diene monomer are mentioned, for example, 1,3-butadiene, 1,3-pentadiene, 1,3-hexadiene and the like. Among them, 1,3-butadiene is preferable. Also, as the aromatic vinyl monomer used in the copolymerization with the conjugated diene monomer are mentioned, for example, styrene, α-methylstyrene, 1-vinylnaphthalene, 3-vinyltoluene, ethylvinylbenzene, divinylbenzene, 4-cyclohexylstyrene, 2,2,6-tolylstyrene and the like. Among them, styrene is preferable.

The conjugated diene-based polymer can be produced in various ways. The polymerization system may be a batch system or a continuous system. The preferable production method is as follows. That is, the polymer is obtained by polymerizing the monomer(s) including the conjugated diene in an inert solvent, preferably a hydrocarbon solvent, in the presence of an initiator such as an organic metal or the like, preferably an organic lithium compound initiator. The hydrocarbon solvent is not particularly limited and includes, for example, n-pentane, n-hexane, n-heptane, cyclohexane, benzene, toluene and so on. The preferable solvent is cyclohexane and n-hexane. These hydrocarbon solvents may be used alone or in a combination of two or more. The organic lithium used as the initiator is preferable to be a hydrocarbon lithium compound containing at least one lithium atom bonded and having a carbon number of 2 to 20 and includes, for example, n-butyl lithium, ethyl lithium, n-propyl lithium, tert-octyl lithium, phenyl lithium and so on. Among them, n-butyl lithium is preferable. These organic lithium initiators may be used alone or in a combination of two or more.

The vinyl bond content can be properly changed by adding an appropriate amount of ether and/or a tertiary amine such as ditetrahydrofuryl propane, tetrahydrofuran, diethyl ether, dimethoxybenzene, dimethoxyethane, ethylene glycol dibutyl ether, triethylamine, pyridine, N,N,N',N',-tetramethyl ethylenediamine and dipiperidinoethane to the polymerization system.

The temperature in this polymerization reaction is usually selected within a range of −80 to 150° C., preferably −20 to 100° C. The polymerization reaction may be carried out under a building-up pressure, but it is desirable that the reaction is usually conducted under a pressure enough to keep the monomer at substantially a liquid phase. That is, although the pressure depends on individual substances to be polymerized, a polymerization medium used and a polymerization temperature used, a higher pressure can be used if desired. Such a pressure is obtained in an appropriate manner such as pressurizing of a reactor vessel with an inert gas with respect to the polymerization reaction, or the like.

As the conjugated diene-based polymer used in the rubber component of the rubber composition of the item (4) is preferably used a modified conjugated diene-based polymer containing tin atom, nitrogen atom and/or silicon atom in its molecule. Such a modified conjugated diene-based polymer is preferable because it suppresses the lowering of the elastic modulus due to the rise of the temperature and but also can suppress the heat generation in a rubber composition compounded with carbon black in case of introducing tin atom or nitrogen atom or in a rubber composition compounded with a reinforcing inorganic filler such as silica or the like in case of introducing silicon atom. Furthermore, the content of the modified conjugated diene-based polymer having the vinyl bond content in conjugated diene units in the rubber component of not less than 25% and containing at least one of tin atom, nitrogen atom and silicon atom in its molecule is preferable to be not less than 50% by mass, and not less than 80% by mass of the conjugated diene-based polymer is preferable to be a modified conjugated diene-based polymer containing at least one of tin atom, nitrogen atom and silicon atom in its molecule. Also, the conjugated diene-based polymer is particularly preferable to have a branched structure. The branched structure can be introduced by using an initiator having a functionality of not less than 3, a modifying agent having a functionality of not less than 3, a monomer having a polymerization-active group of not less than 2 or the like, but the use of the modifying agent having the functionality of not less than 3 is preferable. The above modified polymer is produced in a well-known method. It is usually obtained by starting the polymerization with the organic lithium initiator and then adding various modifying agents to the solution of the polymer having the lithium-activated terminal (JP-B-H06-89183, JP-A-H11-29659 and so on). The charge of the modifying agent is preferable to be conducted after the completion of the polymerization.

For example, the tin atom can be introduced by a tin compound such as tin tetrachloride, tributyltin, dioctyltin dichloride, dibutyltin dichloride, triphenyltin chloride or the like. The nitrogen atom can be introduced by an isocyanate-based compound such as 2,4-tolylene diisocyanate, diphenylmethane diisocyanate or a polymeric diphenylmethane diisocyanate; an aminobenzophenone compound such as 4,4'-bis(diethylamino)-benzophenone or 4-(dimethylamino) benzophenone; an urea derivative such as 1,3-dimethyl-2-imidazolidinone, 1,3-diethyl-2-imidazolidinone or 1,3-dimethyl-3,4,5,6-tetrahydropyrimidine; or a nitrogen-containing compound such as 4-dimethylaminobenzylideneaniline, dimethylimidazolidinone or N-methylpyrrolidone. The silicon atom can be introduced by a terminal modifying agent such as alkoxysilane or aminoalkoxysilane.

Among them, an isocyanate-based compound containing a nitrogen atom in its molecule is preferable. As the modifying agent used in the isocyanate-modified diene rubber according to the invention are preferable isocyanete compounds such as diphenymethane diisocyanate (MDI), a polymeric diphenylmethane diisocyanate (polymeric MDI), 2,4-tolylene diisocyanate, 2,6-tolylene diisocyanate, xylylene diisocyanate, naphtylene diisocyanate, biphenylene diisocyanate, diphenyl ether diisocyanate, tridine diisocyanate, hexamethylene diisocyanate, isophorone diisocyanate and so on. Particularly, diphenylmethane diisocyanate (MDI) and/or a polymeric diphenylmethane diisocyanate (polymeric MDI) are preferable in view of the performance and the cost. Practically, a crude MDI (C-MDI), which is a mixture of MDI and a polymeric MDI, is preferably used.

As a typical polymeric MDI are mentioned compounds represented by the following formulae (VI), (VII), (VIII) and (IX):

(VI)

(wherein n is an integer of 1-5);

(VII)

(VIII)

(IX)

(R in the formulae (VII), (VIII) and (IX) is a group having the following structure (X))

(X)

The formula (VII) is uretidine dione being the dimer of MDI, the formula (VIII) is isocyanurate being the trimer of MDI and the formula (IX) is uretone imine.

As an example of C-MDI is one comprising about 40% by mass of MDI, about 20% by mass of n=1 component and about 10% by mass of n=2 component of the polymeric MDI represented by the formula (VI), and about 30% by mass comprised of n=3 or more component of the polymeric MDI represented by the formula (VI), the dimer of MDI, the trimer of MDI, uretone imine and so on.

In the rubber composition of the item (4), other rubber component capable of mixing with the above conjugated diene-based polymer is not particularly limited and includes, for example, natural rubber (NR), a cis-1,4-polybutadiene (BR), a styrene-butadiene copolymer rubber (SBR), an acrylonitrile-butadiene rubber (NBR), a chloroprene rubber (CR), a butyl rubber (IIR) and the like. These rubber components may be used alone or in a blend of two or more.

The rubber composition of the item (4) is preferable to contain not less than 3 parts by mass in total of a resin and a curing agent thereof based on 100 parts by mass of the rubber component. When the content is not less than 3 parts by mass, a desired tensile elastic modulus is obtained. While, when the content of the resin and the curing agent is less than 10 parts by mass, the increase of the loss tangent (tan δ) of the rubber is suppressed and the lowering of the run-flat durability can be suppressed. Therefore, the resin and the curing agent are desirable to be included in an amount of not less than 3 parts by mass but less than 10 parts by mass in total based on 100 parts by mass of the rubber component. Thus, the rubber composition of the item (4) can improve the elastic modulus at 100% elongation without sacrificing other performances such as dynamic elastic modulus and the like. At this moment, the mass ratio (A/B) of the resin (particularly phenolic resin) (A) to the curing agent (B) used in the rubber composition of the item (4) is preferable to be 10/90 to 90/10, more preferably 90/10 to 50/50.

As the resin are used thermosetting resins such as phenolic resin, melamine resin and so on. Among them, the phenolic rein is particularly preferable. The phenolic resin is an oligomer or a polymer obtained by condensing phenols and aldehydes. As the phenols are used a lower alkyl phenol such as phenol, various cresols, xylenol, tert-butylphenol or the like; a higher phenol such as nonylphenol, cashew oil, lignin or the like; a bivalent phenol such as resorcin or catechol; and so on. As the aldehydes is mainly used formaldehyde. As a main phenolic resin are mentioned a phenol-formaldehyde resin, a resorcin-formaldehyde resin, a cresol resin and so on, and particularly the phenol-formaldehyde resin is preferable. As the phenolic resin, a natural resin-modified phenol resin, an oil-modified phenol resin and the like may be used in addition to 100% phenol resin.

Also, as the phenolic resin, it is preferable to use a novolak-type resin being a two-step resin to be cured by using with a curing agent. As the curing agent are mentioned hexamethylene tetramine, hexamethoxymethyl melamine and so on. The combination of the resin and the curing agent may be freely selected, and also plural resins and plural curing agents may be selected. Moreover, a resin previously added with a curing agent may be used.

The rubber composition of the item (4) can be properly compounded with ingredients usually used in the rubber industry such as a softening agent, an antioxidant, a vulcanizing agent, a vulcanization accelerator, a scorch retarder, zinc white, stearic acid, a silane coupling agent and the like within a scope of not damaging the object of the invention in addition to the rubber component including the conjugated diene-based polymer, the resin and the curing agent. As the ingredients may be preferably used commercially available ones. The rubber composition can be produced by compounding the rubber component with, if necessary, the properly selected various ingredients and milling, warming, extruding and so on. Moreover, the rubber composition of the item (4) may be a composite with a particle, a fiber, a fabric or the like of various materials.

The pneumatic tire according to the invention can be produced according to the usual method by applying the carcass ply, which is formed by covering the reinforcing cord including the above-mentioned polyketone fiber with the coating rubber, to the radial carcass 4 and applying the rubber composition of the items (4) to the side reinforcing rubber layer 5. Also, by applying the reinforcing cord including the polyketone fiber to the belt cord or applying the rubber composition of the item (4) to the bead filler 7 can be further improved the action and effects of the invention. In the pneumatic tire according to the invention, as a gas filled into the tire can be used usual air or air having a regulated partial oxygen pressure but also inert gases such as nitrogen and so on.

In the pneumatic tire according to the invention, the thickness of the side reinforcing rubber layer 5 is not particularly limited and properly set a preferable value according to the differences of the tire size and so on, but the maximum thickness of the side reinforcing rubber layer is usually preferable to be within a range of 6 to 13 mm.

The pneumatic tire according to the invention is preferably used in various vehicles such as a passenger car, a light passenger car, a small truck, a small bus, a light truck, a heavy truck, a heavy bus and the like, particularly a passenger car.

EXAMPLE

The following examples are given in illustration of the invention and are not intended as limitations thereof.

(Production Example of Rubber Composition as a Coating Rubber)

A rubber composition as a coating rubber is prepared according to a compounding recipe shown in Table 1. Moreover, the dynamic elastic modulus (E'), loss tangent (tan δ) and viscosity (G') of the rubber composition are measured according to the following methods. The results are shown in Table 1.

(1) Dynamic Elastic Modulus (E') and Loss Tangent (Tan δ)

A sheet having a width of 5 mm and a length of 40 mm as a sample is cut out from a slab sheet having a thickness of 2 mm obtained by vulcanizing the above rubber composition at 160° C. for 12 minutes. With respect to the sample, the dynamic elastic modulus (E') and loss tangent (tan δ) are measured by a spectrometer manufactured by Ueshima Seisakusho Co., Ltd. under conditions that a distance between chucks is 10 mm, an initial strain is 200 µm, a dynamic strain is 1%, a frequency is 52 Hz and a measurement temperature is 25° C.

(2) Viscosity (G')

The viscosity (G') is measured under conditions that a measurement temperature is 130° C., a strain is 100% and a frequency is 1 Hz.

TABLE 1

|  |  | Rubber composition A-1 | Rubber composition B-1 | Rubber composition C-1 | Rubber composition D-1 |
|---|---|---|---|---|---|
| Natural rubber | parts | 80 | 100 | 70 | 100 |
| SBR *1 | by | 20 | — | 30 | — |
| HAF grade carbon black | mass | 40 | — | — | — |
| FEF grade carbon black |  | — | 40 | — | 50 |
| GPF grade carbon black |  | — | — | 40 | — |
| Stearic acid |  | 1 | 3 | 1 | 3 |
| Antioxidant *2 |  | 1 | 1.5 | 1 | 1.5 |
| Zinc white |  | 4 | 10 | 4 | 10 |
| Sulfur |  | 2.5 | 4 | 2.5 | 4 |
| E' (1% strain) | MPa | 6.5 | 7.9 | 4.2 | 9.5 |
| tan δ (1% strain) |  | — | 0.15 | 0.09 | 0.09 | 0.1 |
| G' (130° C.) | MPa | 64 | 47 | 55 | 58 |

*1 SBR1778 manufactured by JSR Corporation.
*2 Nocrac 6C manufactured by Ouchishinko Chemical Industrial Co., Ltd., N-(1,3-dimethylbutyl)-N'-phenyl-p-phenylenediamine.

(Production Example of Polyketone Fiber Cord)

A polyketone polymer prepared by completely and alternately copolymerizing ethylene and carbon monoxide according to a usual manner and having a limit viscosity of 5.3 is added to an aqueous solution containing 65% by mass of zinc chloride and 10% by mass of sodium chloride and stirred and dissolved at 80° C. for 2 hours to obtain a dope having a polymer concentration of 8% by mass. This dope is warmed to 80° C. and filtered through a 20 μm sintered filter and thereafter extruded from 50 spinning holes with a spinning diameter of 0.1 mm kept at 80° C. through an air gap having a length of 10 mm into an aqueous solution of 18° C. containing 5% by mass of zinc chloride at a discharge rate of 2.5 cc/min and then drawn at a rate of 3.2 m/min to form a coagulated thread line. Subsequently, the thus coagulated thread line is washed with an aqueous solution of sulfuric acid having a concentration of 2% by mass at 25° C. and further with water at a temperature of 30° C. and then wound up at a rate of 3.2 m/min. This coagulated thread line is impregnated with 0.05% by mass of each of IRGANOX1098 [manufactured by Ciba Specialty Chemicals Inc.] and IRGANOX1076 [manufactured by Ciba Specialty Chemicals Inc.] (based on the polyketone polymer). Thereafter, the coagulated thread line is dried at 240° C. and a finishing agent is applied to obtain an undrawn yarn. As the finishing agent is used a composition prepared by compounding 30% by mass of a lauryl oleate ester, 30% by mass of bisoxyethyl bisphenol A, 10% by mass of polyether (propylene oxide/ethylene oxide=35/65, a molecular weight of 20000), 5% by mass of oleyl ether added with 10 mol of polyethylene oxide, 23% by mass of castor oil ether added with 10 mol of polyethylene oxide, 1% by mass of sodium stearyl sulfonate and 1% by mass of sodium dioctylphosphate. The resulting undrawn yarn is subjected to a drawing with the first stage at 240° C., the second stage at 258° C., the third stage at 268° C. and the fourth stage at 272° C. and further to a drawing at the fifth stage of 1.08-fold at 200° C. (a drawing tension is 1.8 cN/dtex) and is wound up with a winder to obtain a polyketone fiber having a strength of 15.6 cN/dtex, an elongation of 4.2%, an elastic modulus of 347 cN/dtex and a heat shrinkage factor after dry-heating at 150° C. for 30 minutes of 3.0%. The total drawing ratio from the undrawn yarn to the fifth-stage drawn yarn is 17.1-fold.

Polyketone fiber cords having a structure, a final twisting coefficient, an elastic modulus and a heat shrinkage stress as shown in Tables 2-3 and 5-6 are obtained by twisting the resulting polyketone fibers.

(Production Example of Rayon Fiber Cord)

Rayon fiber cords having a structure, a final twisting coefficient, an elastic modulus and a heat shrinkage stress as shown in Tables 2 and 5 are prepared according to the usual method.

Moreover, the heat shrinkage stress σ and the elastic modulus E of each of the polyketone fiber cord and the rayon fiber cord are measured according to the following methods.

(3) Heat Shrinkage Stress σ

A sample of the cord having a fixed length of 25 cm and subjected to a usual dipping treatment prior to the vulcanization is heated at a temperature rising rate of 5° C./minute, and a stress generated at 177° C. in the cord is measured.

(4) Elastic Modulus E at 25° C. Under a Load of 49 N (cN/dtex)

It is calculated from a tangent line at 49 N in S—S curve by a tensile test of the cord according to JIS.

(Tire Production Example 1)

Coated cords are produced by arranging the resulting fiber cords as a weft in parallel with each other so as to provide an end count as shown in Tables 2 and 3, roughly placing fine and weak warps in a sufficient amount to hold the shape to form a tire fabric of the fiber cords and covering with a coating rubber in a combination as shown in Tables 2 and 3. There are prepared run-flat tires of a side reinforcing type having a tire size of 215/45ZR17 and a structure shown in FIG. 1 by applying the resulting coated cords to the carcass ply. Also, the run-flat durability, ride comfort and workmanship of the resulting tire are evaluated according the following methods to obtain results shown in Tables 2 and 3. Moreover, a rubber composition prepared by compounding 50 parts by mass of FEF grade carbon black, 1 part by mass of stearic acid, 5 parts by mass of zinc white and 6 parts by mass of sulfur based on 30 parts by mass of natural rubber and 70 parts by mass of butadiene rubber is used in a side reinforcing rubber layer. The rubber composition used in the side reinforcing rubber layer has a loss tangent (tan δ) at 25° C. and 1% strain of 0.09 and a dynamic elastic modulus (E') at 25° C. and 1% strain of 12.5 MPa.

(5) Run-Flat Durability

A tire to be tested is assembled onto a rim under a normal pressure, inflated under an inner pressure of 200 kPa and left in a room of 38° C. for 24 hours and then the inner pressure is rendered into an atmospheric pressure by pulling out a core of a valve and thereafter subjected to a running test on a drum under conditions that a load is 4.17 kN (425 kg), a speed is 89 km/h and a temperature is 38° C. In this case, the running distance of the tire until the occurrence of trouble is measured and represented by an index on the basis that the running distance until the occurrence of trouble in the tire of Comparative Example 1-1 is 100. The larger the index value, the longer the running distance until the occurrence of trouble and the more excellent the run-flat durability.

(6) Ride Comfort

Each test tire is mounted on a vehicle and then an actual feeling test on the ride comfort is conducted by two professional drivers. In this case, the ride comfort is evaluated by calculating an average value from the values of the two professional drivers measured by a ten-point method. The larger the average value, the better the ride comfort.

(7) Workmanship of Tire

The workmanship of the tire is determined by a penetration evaluation on such a portion that the deformation of the tire becomes maximum through the bending in the run-flat running (maximum bending portion). Concretely, a gauge between the ply cord and the side reinforcing rubber layer in the maximum bending portion of the test tire is measured, from which it is judged that a minus value of the gauge or a case of denting the ply cord into the side reinforcing rubber layer is considered as "defect" and a plus value of the gauge is considered as "good".

TABLE 2

| | | | Comparative Example 1-1 | Comparative Example 2-1 | Comparative Example 3-1 | Example 1-1 | Example 2-1 |
|---|---|---|---|---|---|---|---|
| Kind of rubber composition used in coating rubber | | | A-1 | A-1 | B-1 | C-1 | C-1 |
| Constitution of carcass ply | Material of reinforcing cord | — | rayon | polyketone | polyketone | polyketone | polyketone |
| | Cord structure | dtex/filament bundles | 1840/3 | 1670/2 | 1670/2 | 1670/2 | 1670/2 |
| | Final twisting number n | turns/10 cm | 38 | 48 | 48 | 34 | 40 |
| | Specific gravity of cord ρ | g/cm³ | 1.52 | 1.35 | 1.35 | 1.35 | 1.35 |

TABLE 2-continued

|  |  |  | Comparative Example 1-1 | Comparative Example 2-1 | Comparative Example 3-1 | Example 1-1 | Example 2-1 |
|---|---|---|---|---|---|---|---|
|  | Final twisting coefficient N |  | — | 0.83 | 0.84 | 0.84 | 0.6 | 0.70 |
|  | Elastic modulus E of cord at 25° C. under a load of 49 N | cN/dtex | 46 | 122 | 122 | 145 | 135 |
|  | Heat shrinkage stress σ of cord at 177° C. | cN/dtex | 0.06 | 0.92 | 0.92 | 0.65 | 0.71 |
|  | End count | cords/50 mm | 35 | 35 | 35 | 35 | 35 |
| Tire evaluation | Run-flat durability | index | 100 | 180 | 40 | 215 | 220 |
|  | Ride comfort | rating | 5.0 | 5.0 | 3.0 | 6.5 | 6.5 |
|  | Workmanship of tire | judgement | Good | Good | Defect | Good | Good |

TABLE 3

|  |  |  | Example 3-1 | Example 4-1 | Example 5-1 | Example 6-1 |
|---|---|---|---|---|---|---|
|  | Kind of rubber composition used in coating rubber |  | C-1 | C-1 | D-1 | C-1 |
| Constitution of carcass ply | Material of reinforcing cord |  | polyketone | polyketone | polyketone | polyketone |
|  | Cord structure | dtex/filament bundles | 1670/2 | 1670/2 | 1670/2 | 1670/2 |
|  | Final twisting number n | turns/10 cm | 48 | 48 | 48 | 51 |
|  | Specific gravity of cord ρ | g/cm³ | 1.35 | 1.35 | 1.35 | 1.35 |
|  | Final twisting coefficient N | — | 0.84 | 0.84 | 0.84 | 0.90 |
|  | Elastic modulus E of cord at 25° C. under a load of 49 N | cN/dtex | 122 | 122 | 122 | 117 |
|  | Heat shrinkage stress σ of cord at 177° C. | cN/dtex | 0.92 | 0.92 | 0.92 | 0.85 |
|  | End count | cords/50 mm | 35 | 30 | 35 | 35 |
| Tire evaluation | Run-flat durability | index | 215 | 210 | 270 | 230 |
|  | Ride comfort | rating | 7.0 | 7.5 | 6.5 | 7.0 |
|  | Workmanship of tire | judgement | Good | Good | Good | Good |

As seen from Tables 2 and 3, the tires using the cord satisfying the equations (I) and (II) as a reinforcing cord of the carcass ply are excellent in the run-flat durability as compared with the tire of Comparative Example 1-1 using the rayon cord as a reinforcing cord of the carcass ply except for the tire of Comparative Example 3-1. In the tire of Comparative Example 3-1, the rubber composition B-1 having a viscosity (G') at 130° C. during the unvulcanization of less than 50 MPa is used in the coating rubber, so that the workmanship of the tire is deteriorated, and hence the run-flat durability and the ride comfort are lowered.

As seen from the results of Tables 2 and 3, the tires of Examples are higher in the run-flat durability than the tire of Comparative Example 2-1 and further excellent in the ride comfort because the rubber composition having the loss tangent (tan δ) at 25° C. and 1% strain of less than 0.12 and the viscosity (G') at 130° C. during the unvulcanization of less than 50 MPa is used in the coating rubber. In addition, since the rubber composition D-1 has the dynamic elastic modulus (E') at 25° C. and 1% strain of not less than 8.0 MPa, the run-flat durability is considerably improved in the tire of Example 5-1.

(Production Example of Conjugated Diene-Based Polymer (High-Vinyl Butadiene))

Into a pressure reaction vessel of 8 liters dried and purged with nitrogen and provided with a temperature-regulating jacket is continuously charged a solution of 15% by mass of a dried butadiene in cyclohexane at a rate of 200 g per minute. Also, a solution of 1 mol/liter of ditetrahydrofurylpropane (DTHFP) in cyclohexane at a rate of 0.15 mmol/min and a solution of n-butyllithium in n-hexane at a rate of 0.2 mmol/min are continuously introduced through the same port. The polymerization system is constantly kept at 80° C. and the resulting polymer is continuously taken out from an upper portion of the reactor and charged into a solution of 1% by mass of 2,6-di-t-butyl-p-cresol (BHT) in isopropanol to obtain a polymer. The polymer is evenly transparent because precipitates are not absolutely observed from beginning to end of the polymerization. The conversion of the polymerization is approximately 100%. The solid matter is further dried to obtain a rubbery polymer. The vinyl bond content, weight average molecular weight (Mw) and molecular weight distribution of this polybutadiene polymer are measured according to the following methods. The vinyl bond content is 50%, the weight average molecular weight (Mw) is 500,000 and the molecular weight distribution (Mw/Mn) is 2.1.

(8) Microstructure of Polymer

The vinyl bond (1,2-bond) content in the conjugated diene unit is determined by an infrared method (Morello method).

(9) Weight Average Molecular Weight (Mw) of Polymer

The weight average molecular weight (Mw) of the polymer as converted to polystyrene is measured through a gel permeation chromatography [GPC; HLC-8020 manufactured by TOSOH, column; GMX-XL (two series columns) manufactured by TOSOH] using a differential refractive index (RI) as a standard of monodisperse polystyrene.

(Tire Production Example 2)

<Carcass Ply>

A carcass ply is comprised of cord as shown in Tables 5 and 6 and a coating rubber covering the cords. That is, a certain twisting is applied to the above-mentioned fibers, and 2 to 3 fibers are twisted to form a weft, and the resulting wefts are aligned with each other and fine and weak warps are roughly placed therein to form a tire cord fabric, which is subjected to an adhesive treatment for the adhesion to rubber. Thereafter, a topping rubber is applied thereonto at a certain thickness to form a rubberized cord fabric. Then, the rubberized cord fabric is cut so as to render the weft into a certain length and the cut sections are joined at their both edge portions except for the cut faces to form a carcass material for a radial tire. In the tire building, such a carcass material is cut on a drum shaping machine (or similar equipment) in the same direction as the weft and joined to render into a cylindrical form.

<Rubber Composition for Side Reinforcing Rubber Layer>

A rubber composition for the side reinforcing rubber layer is prepared according to a compounding recipe as shown in Table 4. Moreover, the dynamic elastic modulus (E') (MPa) and the viscosity (G') at 130° C. during the unvulcanization of the rubber composition are measured according to the above methods (1) and (2), and the elastic modulus at 100% elongation (MPa) is measured according to the following method. As to the method (2), the dynamic elastic modulus (E') at each temperature is measured by varying a preset temperature. The results are shown in Table 4.

(10) Elastic Modulus at 100% Elongation (MPa)

The tensile elastic modulus at a measuring temperature of 25° C. and 100% elongation of a slab sheet obtained by vulcanizing the rubber composition at 160° C. for 12 minutes is measured according to JIS K6251:2004.

<Tire>

Then, a radial tire for a passenger car having a structure shown in FIG. 1 and a tire size of 215/45ZR17 is prepared according to the usual method by applying the rubber composition as shown in Table 4 to the side reinforcing rubber layer and cords as shown in Tables 5 and 6 to the carcass ply, respectively. Moreover, the run-flat durability, ride comfort and workmanship of the tire are evaluated according to the above methods (5) to (7) to obtain results shown in Tables 5 and 6. In this case, the run-flat durability is represented by an index on the basis that the running distance until the occurrence of trouble in the tire of Comparative Example 1-2 is 100. The maximum thickness of the side reinforcing rubber layer as a reinforcing rubber gauge is described in Table 4.

TABLE 4

|  |  | Rubber composition A-2 | Rubber composition B-2 | Rubber composition C-2 | Rubber composition D-2 | Rubber composition E-2 | Rubber composition F-2 | Rubber composition G-2 |
| --- | --- | --- | --- | --- | --- | --- | --- | --- |
| Natural rubber | parts | 30 | 30 | 30 | 30 | 30 | 30 | 30 |
| Polybutadiene rubber *3 | by | 70 | 70 | 70 | — | — | — | — |
| High vinyl butadiene rubber *4 | mass | — | — | — | 70 | 70 | 70 | 70 |
| Carbon black *5 |  | 40 | 50 | 60 | 40 | 50 | 50 | 60 |
| Phenol resin *6 |  | — | — | — | 3 | 3 | 6 | 3 |
| Curing agent *7 |  | — | — | — | 1 | 1 | 2 | 1 |
| Stearic acid |  | 1 | 1 | 1 | 1 | 1 | 1 | 1 |
| Antioxidant 6C *8 |  | 1 | 1 | 1 | 1 | 1 | 1 | 1 |
| Zinc white |  | 5 | 5 | 5 | 5 | 5 | 5 | 5 |
| Vulcanization accelerator NS *9 |  | 2 | 2 | 2 | 2 | 2 | 2 | 2 |
| Sulfur |  | 6 | 6 | 6 | 6 | 6 | 6 | 6 |
| Elastic modulus at 100% elongation (25° C.) | MPa | 4.6 | 7.9 | 11.2 | 7.3 | 10.8 | 11.2 | 12.9 |
| E' at 25° C. (1% strain) | MPa | 9.2 | 13.5 | 15.5 | 8.5 | 9.8 | 10.0 | 10.3 |
| (Minimum value of E' between 200° C. and 250° C./E' at 50° C.) × 100 (1% strain) | % | 66 | 64 | 67 | 88 | 89 | 84 | 85 |
| G' (130° C.) | MPa | 47 | 53 | 61 | 48 | 52 | 58 | 64 |
| Reinforcing rubber gauge | mm | 8 | 8 | 8 | 8 | 8 | 8 | 8 |

*3 Polybutadiene, BR01 (manufactured by JSR Corporation, cis-1,4-polybutadiene, 2.5% of vinyl bond content)
*4 Conjugated diene-based polymer (high vinyl polybutadiene): 50% of vinyl bond content, 500,000 of weight average molecular weight (Mw), 2.1 of molecular weight distribution (Mw/Mn).
*5 Carbon black: GPF (trademark; Asahi #55 manufactured by Asahi Carbon Co., Ltd.)
*6 Phenol resin: phenol-formaldehyde resin (novolak-type) manufactured by Sumitomo Bakelite Co., Ltd.
*7 Hexamethylene tetramine: manufactured by Ouchishinko Chemical Industrial Co., Ltd.
*8 N-(1,3-dimethylbutyl)-N'-phenyl-p-phenylenediamine.
*9 N-t-butyl-2-benzothiazolyl sulfenamide.

TABLE 5

|  |  |  | Comparative Example 1-2 | Comparative Example 2-2 | Comparative Example 3-2 | Comparative Example 4-2 | Comparative Example 5-2 | Example 1-2 |
| --- | --- | --- | --- | --- | --- | --- | --- | --- |
|  | Kind of rubber composition used in side reinforcing rubber layer |  | A-2 | A-2 | B-2 | C-2 | D-2 | E-2 |
| Constitution of carcass ply | Material of reinforcing cord | — | rayon | polyketone | polyketone | polyketone | polyketone | polyketone |
|  | Cord structure | dtex/filament bundles | 1840/3 | 1670/2 | 1670/2 | 1670/2 | 1670/2 | 1670/2 |
|  | Final twisting coefficient N | — | 0.83 | 0.84 | 0.84 | 0.84 | 0.84 | 0.84 |
|  | End count | cords/50 mm | 35 | 35 | 35 | 35 | 35 | 35 |
|  | Heat shrinkage stress σ of cord at 177° C. | cN/dtex | 0.06 | 0.92 | 0.92 | 0.92 | 0.92 | 0.92 |
|  | Elastic modulus E of cord at 25° C. under a load of 49 N | cN/dtex | 46 | 124 | 124 | 124 | 124 | 124 |

TABLE 5-continued

|  |  |  | Comparative Example 1-2 | Comparative Example 2-2 | Comparative Example 3-2 | Comparative Example 4-2 | Comparative Example 5-2 | Example 1-2 |
|---|---|---|---|---|---|---|---|---|
| Tire evaluation | Run-flat durability | index | 100 | 50 | 220 | 245 | 45 | 275 |
|  | Ride comfort | rating | 5.0 | 3.0 | 4.5 | 4.0 | 3.0 | 7.0 |
|  | Workmanship of tire | judgement | Good | Defect | Good | Good | Defect | Good |

TABLE 6

|  |  |  | Example 2-2 | Example 3-2 | Example 4-2 | Example 5-2 | Example 6-2 | Example 7-2 |
|---|---|---|---|---|---|---|---|---|
|  | Kind of rubber composition used in side reinforcing rubber layer |  | E-2 | E-2 | E-2 | E-2 | F-2 | G-2 |
| Constitution of carcass ply | Material of reinforcing cord | — | polyketone | polyketone | polyketone | polyketone | polyketone | polyketone |
|  | Cord structure | dtex/filament bundles | 1670/2 | 1670/2 | 1670/2 | 1670/2 | 1670/2 | 1670/2 |
|  | Final twisting coefficient N | — | 0.60 | 0.70 | 0.90 | 0.84 | 0.84 | 0.84 |
|  | End count | cords/50 mm | 35 | 35 | 35 | 30 | 35 | 35 |
|  | Heat shrinkage stress σ of cord at 177° C. | cN/dtex | 0.65 | 0.71 | 0.85 | 0.92 | 0.92 | 0.92 |
|  | Elastic modulus E of cord at 25° C. under a load of 49 N | cN/dtex | 147 | 137 | 121 | 124 | 124 | 124 |
| Tire evaluation | Run-flat durability | index | 260 | 280 | 290 | 270 | 290 | 305 |
|  | Ride comfort | rating | 6.0 | 6.5 | 7.0 | 7.5 | 6.5 | 6.0 |
|  | Workmanship of tire | judgement | Good | Good | Good | Good | Good | Good |

As seen from Tables 5 and 6, the tires of Examples (run-flat tire) are excellent in the tire shape (workmanship of the tire) and largely improve the run-flat durability without damaging the ride comfort.

The invention claimed is:

1. A pneumatic tire comprising a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion,
   wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the following equations (I) and (II):

$$\sigma \geq -0.01 \times E + 1.2 \quad \text{(I)}$$

$$\sigma \geq 0.02 \quad \text{(II)}$$

[wherein σ is a heat shrinkage stress (cN/dtex) at 177° C. and E is an elastic modulus (cN/dtex) at 25° C. under a load of 49 N]
   and as the coating rubber is used a rubber composition having a loss tangent (tan δ) at 25° C. and 1% strain of less than 0.12 and a viscosity (G'), measured under conditions that a measurement temperature is 130° C., a strain is 100% and a frequency is 1 Hz, during the unvulcanization of not less than 50 MPa.

2. A pneumatic tire comprising a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion,
   wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the following equations (I) and (II)

$$\sigma \geq -0.01 \times E + 1.2 \quad \text{(I)}$$

$$\sigma \geq 0.02 \quad \text{(II)}$$

[wherein σ is a heat shrinkage stress (cN/dtex) at 177° C. and E is an elastic modulus (cN/dtex) at 25° C. under a load of 49 N]
   and as the coating rubber is used a rubber composition having a dynamic elastic modulus (E') at 25° C. and 1% strain of not less than 8.0 MPa and a viscosity (G'), measured under conditions that a measurement temperature is 130° C., a strain is 100% and a frequency is 1 Hz, during the unvulcanization is not less than 50 MPa.

3. A pneumatic tire comprising a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion,
   wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the following equations (I) and (II)

$$\sigma \geq -0.01 \times E + 1.2 \quad \text{(I)}$$

$$\sigma \geq 0.02 \quad \text{(II)}$$

[wherein σ is a heat shrinkage stress (cN/dtex) at 177° C. and E is an elastic modulus (cN/dtex) at 25° C. under a load of 49 N]

and as the coating rubber is used a rubber composition having a loss tangent (tan δ) at 25° C. and 1% strain of less than 0.12 and a dynamic elastic modulus (E') at 25° C. and 1% strain of not less than 8.0 MPa and a viscosity (G'), measured under conditions that a measurement temperature is 130° C., a strain is 100% and a frequency is 1 Hz, during the unvulcanization is not less than 50 MPa.

4. A pneumatic tire comprising a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers each having a crescent shape in section and disposed at an inside of the carcass in the sidewall portion, wherein the carcass ply is formed by covering plural reinforcing cords arranged in parallel with a coating rubber, and the reinforcing cord is a cord formed by twisting a filament bundle(s) including not less than 50% by mass of a polyketone fiber and satisfies conditions of the following equations (I) and (II):

$$\sigma \geq -0.01 \times E + 1.2 \quad (I)$$

$$\sigma \geq 0.02 \quad (II)$$

[wherein σ is a heat shrinkage stress (cN/dtex) at 177° C. and E is an elastic modulus (cN/dtex) at 25° C. under a load of 49 N]

and to the side reinforcing rubber layer is used a rubber composition in which an elastic modulus at 25° C. and 100% elongation during the vulcanization is 5 to 20 MPa, and a dynamic elastic modulus (E') at 25° C. is not more than 10.5 MPa, and a minimum value of a dynamic elastic modulus (E') between 200° C. and 250° C. is not less than 75% of a dynamic elastic modulus (E') at 50° C., and a viscosity (G') at 130° C. measured under conditions that a measurement temperature is 130° C., a strain is 100% and a frequency is 1 Hz during the unvulcanization is not less than 50 MPa.

5. A pneumatic tire according to claim 1, wherein the reinforcing cord in the carcass ply has a final twisting coefficient (N) defined by the following equation (III):

$$N = 0.001 \times n \times (0.125 \times D/\rho)^{1/2} \quad (III)$$

[wherein n is a final twisting number (turns/10 cm), p is a specific gravity (g/cm³) of the cord, and D is total dtex number (dtex) of the cord] and satisfying the following equation (IV):

$$0.6 \leq N \leq 0.9 \quad (IV).$$

6. A pneumatic tire according to claim 1, wherein an end count of the reinforcing cords in the carcass ply is 35 to 60 cords/50 mm.

7. A pneumatic tire according to claim 4, wherein an end count of the reinforcing cords in the carcass ply is 30 to 60 cords/50 mm.

8. A pneumatic tire according to claim 1, wherein the reinforcing cord in the carcass ply is formed by twisting two or three filament bundles having a fineness of 500 to 2,000 dtex.

9. A pneumatic tire according to claim 1, wherein the polyketone fiber constituting the reinforcing cord has a tensile strength as a raw yarn of not less than 10 cN/dtex, an elastic modulus of not less than 200 cN/dtex and a heat shrinkage factor after dry-heating at 150° C. for 30 minutes of 1 to 5%.

10. A pneumatic tire according to claim 1, wherein polyketone constituting the polyketone fiber has substantially a repeating unit represented by the following general formula (V):

[wherein A is a moiety derived from an unsaturated compound polymerized with unsaturated bonds, and may be same or different in each of repeating units].

11. A pneumatic tire according to claim 10, wherein the unsaturated compound forming A in the general formula (V) is ethylene.

12. A pneumatic tire according to claim 1, wherein a rubber composition formed by compounding a carbon black having a grade of not more than FEF into a rubber component is used in the coating rubber for the carcass ply.

13. A pneumatic tire according to claim 4, wherein a rubber component constituting the rubber composition used in the side reinforcing rubber layer comprises at least 50% by mass of a conjugated diene-based polymer having a vinyl bond content in conjugated diene unit of not less than 25%, a weight average molecular weight (Mw) of 200,000 to 900,000, a molecular weight distribution (Mw/Mn) represented by a ratio of weight average molecular weight to number average molecular weight (Mn) of 1 to 4.

14. A pneumatic tire according to claim 13, wherein the conjugated diene-based polymer constituting the rubber component is a modified conjugated diene-based polymer containing at least one of tin atom, nitrogen atom and silicon atom in a molecule thereof.

15. A pneumatic tire according to claim 14, wherein the modified conjugated diene-based polymer is formed by modifying with an isocyanate compound.

16. A pneumatic tire according to claim 15, wherein the isocyanate compound is diphenylmethane diisocyanate and/or a polymeric diphenylmethane diisocyanate.

17. A pneumatic tire according to claim 4, wherein the rubber composition used in the side reinforcing rubber layer comprises not less than 3 parts by mass in total of a resin and a curing agent thereof based on 100 parts by mass of the rubber component.

18. A pneumatic tire according to claim 17, wherein the resin is a phenol resin.

19. A pneumatic tire according to claim 4, wherein a maximum thickness of the side reinforcing rubber layer is 6 to 13 mm.

* * * * *